United States Patent Office 2,766,100
Patented Oct. 9, 1956

2,766,100

METHOD FOR SEPARATING SODIUM CYANATE FROM SODIUM CYANATE-SODIUM CARBONATE MIXTURE

Donald A. Sayles, Buffalo, N. Y., assignor to Olin Mathieson Chemical Corporation, a corporation of Virginia No Drawing. Application June 6, 1952,
Serial No. 292,189

1 Claim. (Cl. 23—75)

My invention relates to the purification of crude alkali metal cyanates contaminated with the corresponding carbonates.

Alkali metal cyanates, particularly lithium, sodium and potassium cyanates, may be manufactured by reacting carbon dioxide with an alkali metal chloride dissolved in liquid ammonia to form the alkali metal carbamate followed by the thermal decomposition of the carbamate to cyanate. The crude cyanate prepared by this process contains considerable by-product carbonate and is obtained in concentrations of only about 30 to 35 percent cyanate. For some purposes the cyanate products may be used without separation of the carbonate but for many purposes it is desirable to free them from the carbonate. Ordinary separation methods, such as crystallization from water, are not effective because the respective cyanates and carbonates have very similar solubilities.

I have found that contacting crude alkali metal cyanate and carbonate mixtures with aqueous ammonia, of a concentration of about 30 to 80 weight percent of ammonia, at elevated temperatures and pressures selectively extracts the cyanate from the mixture and it can be recovered by separating and cooling the extract and separating crystallized alkali metal cyanate that is substantially pure, e. g. at least about 95 percent cyanate, and suitable for most uses.

According to the process of my invention, I contact a crude alkali metal cyanate and carbonate mixture with an aqueous ammonia solution. The ammonia is in a concentration of about 30 to 80 percent and preferably about 40 percent. The crude mixture and aqueous ammonia are heated under pressure to about 70° to 100° C. A temperature of about 80° C. is particularly advantageous. Pressures are then not excessive and may amount to about 80 to 200 pounds per square inch gauge. The carbonate is substantially insoluble and is removed by suitable separation procedures, for example, filtering. The filtrate containing the extracted cyanate is cooled, advantageously by reducing the pressure to about atmospheric pressure thereby allowing the ammonia to evaporate and cool the solution. Ammonia is recovered for reuse. The resulting slurry of crystallized cyanate and liquor, still containing about 30 percent ammonia, is separated by any suitable means, for example, filtering or centrifuging. The separated cyanate is at least 95 percent pure and is suitable for most uses. It may be further purified if desired by recrystallization from aqueous ammonia solution. The filtrate can advantageously be mixed with additional aqueous ammonia and reused.

The solubility of the alkali metal cyanate, for example, sodium cyanate, in water and in these concentrated ammonia solutions is not greatly different but the corresponding carbonate is much less soluble in the aqueous ammonia solutions than in water. Thus little carbonate is extracted by the aqueous ammonia solution which, however, becomes saturated with cyanate. As the ammonia flashes off when the pressure is reduced and the solution cools, the cyanate separates while the small proportions of carbonate remain in the aqueous solution. To obtain additional quantities of cyanate, the temperature of the solution may be reduced below room temperature, for example, to about 8 to 10° C.

My invention will be further illustrated by the following examples:

*Example I*

A finely ground solid mixture of sodium cyanate and sodium carbonate was extracted by stirring with a 40 percent ammonia-60 percent water solution at 80° C. and 90 p. s. i. g. After ¾ hour the mixture was filtered at this temperature and pressure. The filtrate was flashed to atmospheric pressure. The resulting temperature was about 20° C. The precipitate of 7.5 parts per 100 parts of saturated solution was filtered and dried to obtain a product containing 96 percent sodium cyanate. The filtrate containing about 3 parts of sodium cyanate and 4 parts of sodium carbonate per 100 parts of solution may be mixed with additional ammonia and reused.

*Example II*

A sodium cyanate-sodium carbonate mixture is extracted at 40° C. with a mixture of 80 percent ammonia and 20 percent water under suitable pressure. The filtrate is flashed to atmospheric pressure and 13° C. to precipitate about 14 grams of purified sodium cyanate per 100 grams of filtrate.

*Example III*

Extraction of a sodium cyanate-sodium carbonate mixture with a 60 percent ammonia-40 percent water solution at 46° C. yields a filtrate containing about 8 grams of sodium cyanate per 100 grams of solution. Of this 3.3 grams is recovered on flashing to 28 percent ammonia and 13° C.

I claim:

A method for separating sodium cyanate from a sodium cyanate-sodium carbonate mixture which comprises contacting said mixture with aqueous ammonia having a concentration of about 30 to 80 weight percent ammonia at a temperature of from about 70° to 100° C. and at a pressure of from about 80 to 200 p. s. i. g. to prepare an aqueous extract solution of ammonia, sodium cyanate and sodium carbonate, reducing the pressure on said extract solution to effect evaporation of ammonia therefrom and thereby to cool said solution, whereby substantially pure sodium cyanate precipitates from said solution, and recovering said precipitate from said solution.

References Cited in the file of this patent

UNITED STATES PATENTS

| 2,345,826 | Neumark | Apr. 4, 1944 |
| 2,424,983 | Hill | Aug. 5, 1947 |

FOREIGN PATENTS

| 359,559 | Great Britain | Oct. 26, 1931 |

OTHER REFERENCES

Comey et al.: "A Dictionary of Chemical Solubilities," 2nd ed., pages 206, 208. The MacMillan Co., New York city, 1921.

Hunt: "J. Am. Chem. Soc.," vol. 54, pages 3509–3512, September 1932.